US012789455B2

(12) United States Patent
Rakshit et al.

(10) Patent No.: US 12,789,455 B2
(45) Date of Patent: Nov. 10, 2026

(54) POWDER FUSION THREE-DIMENSIONAL ADDITIVE MANUFACTURING SYSTEM CONFIGURED TO DYNAMICALLY ADJUST ALIGNMENT OF POWDER BED POSITION IN REAL TIME

(71) Applicant: International Business Machines Corporation, Armonk, NY (US)

(72) Inventors: Sarbajit Kumar Rakshit, Kolkata (IN); Binoy Thomas, Kozhikode (IN); Sudheesh S. Kairali, Kozhikode (IN)

(73) Assignee: International Business Machines Corporation, Armonk, NY (US)

(*) Notice: Subject to any disclaimer, the term of this patent is extended or adjusted under 35 U.S.C. 154(b) by 67 days.

(21) Appl. No.: 18/760,147

(22) Filed: Jul. 1, 2024

(65) Prior Publication Data

US 2026/0001273 A1 Jan. 1, 2026

(51) Int. Cl.
*B29C 64/245* (2017.01)
*B29C 64/153* (2017.01)
(Continued)

(52) U.S. Cl.
CPC .......... *B29C 64/245* (2017.08); *B29C 64/153* (2017.08); *B29C 64/25* (2017.08);
(Continued)

(58) Field of Classification Search
CPC ....... B29C 64/245; B33Y 30/00; B33Y 50/00; B33Y 50/02; B22F 12/30; B22F 10/40
(Continued)

(56) References Cited

U.S. PATENT DOCUMENTS

2007/0126157 A1 6/2007 Bredt
2017/0120335 A1 5/2017 Demuth et al.
(Continued)

FOREIGN PATENT DOCUMENTS

CN 218904090 U 4/2023
CN 116100045 A 5/2023
(Continued)

OTHER PUBLICATIONS

Cao, C., et al., "English machine-translation by Clarivate Analytics of CN116100045A with full CN patent application included", B22F10/28, Dec. 30, 2022. (See NPL document filed on Feb. 5, 2026) (Year: 2022).*
(Continued)

*Primary Examiner* — Abbas Rashid
*Assistant Examiner* — Gregory C. Grosso
(74) *Attorney, Agent, or Firm* — Cantor Colburn LLP; Monchai Chuaychoo

(57) ABSTRACT

A powder fusion three-dimensional (3D) additive manufacturing (AM) system is provided. The powder fusion 3D AM system implements a plurality of robotic stages and a plurality of robotic barriers. The plurality of robotic stages have an adjustable upper surface. Each of the robotic stages is configured to self-align themselves to form a foundation of a modular powder bed. The plurality of robotic barriers have vertical walls. Each of the robotic barriers are configured to self-align with the foundation established by the robotic stages. An upper surface of at least one of the robotic stages is adjusted to set an initial height of the modular powder bed configured to receive an AM powder.

8 Claims, 10 Drawing Sheets

(51) Int. Cl.
*B29C 64/25* (2017.01)
*B29C 64/386* (2017.01)
*B33Y 10/00* (2015.01)
*B33Y 30/00* (2015.01)
*B33Y 50/00* (2015.01)

(52) U.S. Cl.
CPC ............ *B29C 64/386* (2017.08); *B33Y 10/00* (2014.12); *B33Y 30/00* (2014.12); *B33Y 50/00* (2014.12)

(58) Field of Classification Search
USPC .......................................................... 264/308
See application file for complete search history.

(56) References Cited

U.S. PATENT DOCUMENTS

| | | | |
|---|---|---|---|
| 2019/0381733 | A1 | 12/2019 | Küsters et al. |
| 2020/0398341 | A1 | 12/2020 | Hellestam |

FOREIGN PATENT DOCUMENTS

| | | | |
|---|---|---|---|
| CN | 117150924 | A | 12/2023 |
| DE | 102021213860 | A1 | 6/2023 |
| WO | 2017121995 | A1 | 7/2017 |
| WO | 2022136843 | A1 | 6/2022 |
| WO | 2024042079 | A1 | 2/2024 |

OTHER PUBLICATIONS

International Searching Authority, "Notification of Transmittal of the International Search Report and the Written Opinion of the International Searching Authority, or Declaration," Patent Cooperation Treaty Sep. 29, 2025, 11 pages, International Application No. —PCT/EP2025/065980.

Anonymous, "Method and System for 3D Dynamic Casting Creation and Infusion of 3D Printing with Swarm Robotic Modules," IP.com, IPCOM000272179D, Apr. 25, 2023, 4 pages.

Chadha et al. "Powder Bed Fusion via Machine Learning-Enabled Approaches." Complexity 2023.1 (2023): 25 pages.

Dejene et al., "Current status and challenges of powder bed fusion-based metal additive manufacturing: literature review." Metals 13.2 (2023): 22 pages.

Duffy, John, "PowderCleanse: Solving powder-bed fusion's waste problem" https://www.malvernpanalytical.com/en/learn/knowledge-center/insights/powdercleanse-solving-powder-bed-fusions-waste-problem (retrieved Jun. 27, 2024): 4 pages.

IBM "Mobile EAM with IBM Maximo Application Suite" www.ibm.com/products/maximo/mobile.eam (retrieved May 24, 2024), 10 pages.

IBM "What is robotic process automation (RPA)?" https://www.ibm.com/cloud/learn/rpa (Retrieved May 24, 2024) 11 pages.

Khaimovich et al. "Optimization of process parameters for powder bed fusion additive manufacturing using a linear programming method: a conceptual framework." Metals 12.11 (2022): 18 pages.

Koizumi et al. "Digital twin science of metal powder bed fusion additive manufacturing: A selective review of simulations for integrated computational materials engineering and science." ISIJ International 62.11 (2022): 2183-2196.

Lupi et al. "Laser powder bed additive manufacturing: A review on the four drivers for an online control." Journal of Manufacturing Processes 103 (2023): 413-429.

Murphy, Patrick "The Manufacturing Side of Digital Transformation: Smart Factories" https://www.IBM.com/blogs/think/2019/03/the-manufacturing-side-of-digital-transformation-smart-factories/ (Retrieved May 24, 2024); 6 pages.

Polaris Mep "Industry 4.0 Readiness Ecosystem: Power Bed Fusion (PBF) and Bound Metal Deposition (BMD) Additive Manufacturing Process" https://polarismep.org/event/industry-4-0-readiness-ecosystem-powder-bed-fusion-pbf-and-bound-metal-deposition-bmd-additive-manufacturing-processes/ (Retrieved Jun. 27, 2024) 5 pages.

Rodríguez et al. "Robot-assisted laser ablation for 3D surfaces. Application for paint removal with ultrashort pulse laser." Optics and Lasers in Engineering 160 (2023): 10 pages.

Shanbhag et al., "Powder reuse cycles in electron beam powder bed fusion—variation of powder characteristics." Materials 14.16 (2021): 19 pages.

Wiberg, Anton. "Towards design automation for additive manufacturing: a multidisciplinary optimization approach." vol. 1854. Linköping University Electronic Press (2019): 69 pages.

* cited by examiner

POWDER FUSION THREE-DIMENSIONAL ADDITIVE MANUFACTURING SYSTEM CONFIGURED TO DYNAMICALLY ADJUST ALIGNMENT OF POWDER BED POSITION IN REAL TIME

BACKGROUND

The present disclosure generally relates to additive manufacturing and more specifically, to a powder fusion three-dimensional (3D) additive manufacturing system configured to dynamically adjust alignment of powder bed position in real time.

Powder Bed Fusion (PBF) is an advanced additive manufacturing process that revolutionizes the production of intricate and customized components. It involves depositing a fine layer of powdered material and using a high-energy source, typically a laser or electron beam, to selectively melt or sinter the powder, layer by layer, into a solid object. This method offers several significant advantages. Firstly, PBF enables the creation of complex and lightweight structures that are challenging or impossible to manufacture using traditional methods. Secondly, it reduces material waste, as only the necessary powder is used in the process, making it more environmentally friendly. Moreover, PBF offers excellent design flexibility, allowing for rapid prototyping and customized production, and it excels in producing high-strength, precise parts with superb mechanical properties. These benefits have made PBF a desirable manufacturing process in various industries such as aerospace, automotive, and healthcare.

SUMMARY

Various non-limiting embodiments of the present invention provide a powder fusion 3D additive manufacturing (AM) system, which dynamically adjusts a position and alignment of a modular powder bed in real time to reduce powder consumption while performing tailored PBF manufacturing. Additionally, the powder fusion 3D AM system further employs a laser unit and is capable of managing laser beam redirection strategies while ensuring proper angular attack for quality powder fusion correction, thereby enhancing the overall efficiency and effectiveness of the powder fusion process.

According to a non-limiting embodiment a powder fusion three-dimensional (3D) additive manufacturing (AM) system is provided. The powder fusion 3D AM system implements a plurality of robotic stages and a plurality of robotic barriers. The plurality of robotic stages have an adjustable upper surface. Each of the robotic stages is configured to self-align themselves to form a foundation of a modular powder bed. The plurality of robotic barriers have vertical walls. Each of the robotic barriers are configured to self-align with the foundation established by the robotic stages. An upper surface of at least one of the robotic stages is adjusted to set an initial height of the modular powder bed configured to receive an AM powder.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
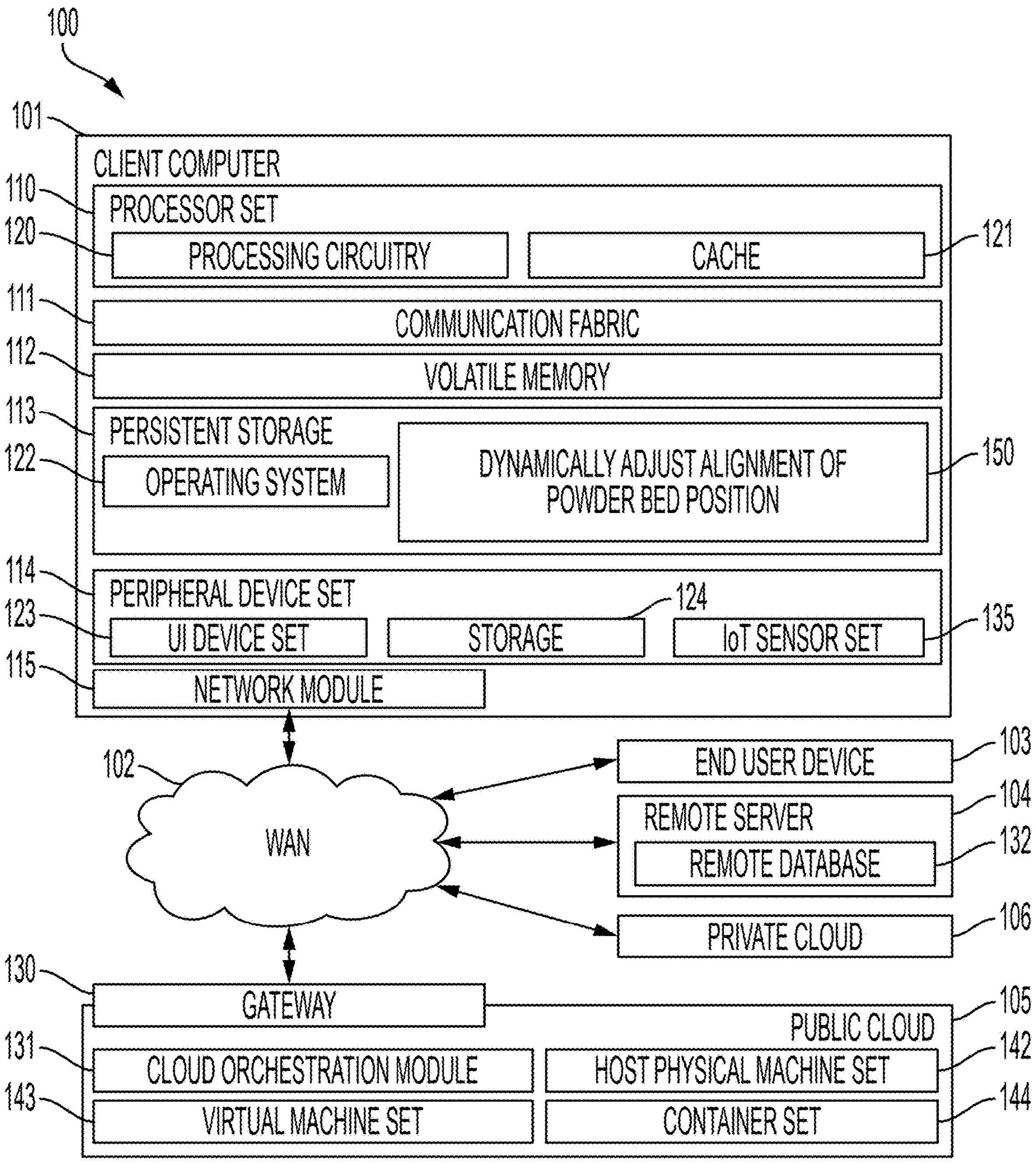
FIG. 1 depicts a block diagram of an example computing environment for use in conjunction with one or more embodiments of the present disclosure.

Various embodiments of the present invention provides a powder fusion 3D AM system that dynamically adjusts alignment of powder bed position with the shape and dimension of the work product being manufactured in real time. According to a non-limiting embodiment, the powder fusion 3D AM system employs an array of swarm self-moving first robotic systems with a plurality of rectangular/square bases. The first robotic system dynamically adjusts the position (e.g., vertical height) of the bases to construct a foundation of a modular powder bed. The shape of the modular powder bed can be dynamically changed by adjusting the positions of one or more of the bases to match the shape and dimensions of the 3D object being created with powder fusion. This ensures the efficient utilization of powder material, enabling the manufacture of 3D objects on the adaptable powder bed.

According to a non-limiting embodiment, the powder fusion 3D AM system dynamically customizes the dimension and shape of the modular powder bed based on the comparative dimensions and shape of the work product is to be manufactured and the modular powder bed. This customization aims to enable the manufacturing of 3D objects using the Powder Bed Fusion method while optimizing powder usage to manufacture the object.

According to a non-limiting embodiment, the powder fusion 3D AM system employs a laser assembly robotic system to adjust a direction of a laser beam for precise application to hard-to-reach areas, ensuring optimal powder consumption and efficient defect correction in powder fusion processes. The powder fusion 3D AM system can also perform dynamic analysis of reflective properties and laser beam redirection scenarios, and adjust the laser beam strength and angular orientation to maintain optimal fusion power, energy delivery, and angle of attack, enabling seamless defect correction on large 3D objects while minimizing powder consumption.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 1, an example computing environment 100 for use in conjunction with one or more embodiments of the present disclosure is illustrated according to a non-limiting embodiment of the present disclosure. The computing environment 100 contains an example of an environment for the execution of at least some of the computer code involved in performing the inventive methods, such as dynamically adjusting an alignment position of a powder bed utilized by a powder fusion 3D AM system as shown at block 150.

In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer, a small single board computer (e.g. a Raspberry Pi) or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages the sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 131 manages the transfer and storage of images, deploys new instantiations of VCEs, and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community, or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Figure 2:
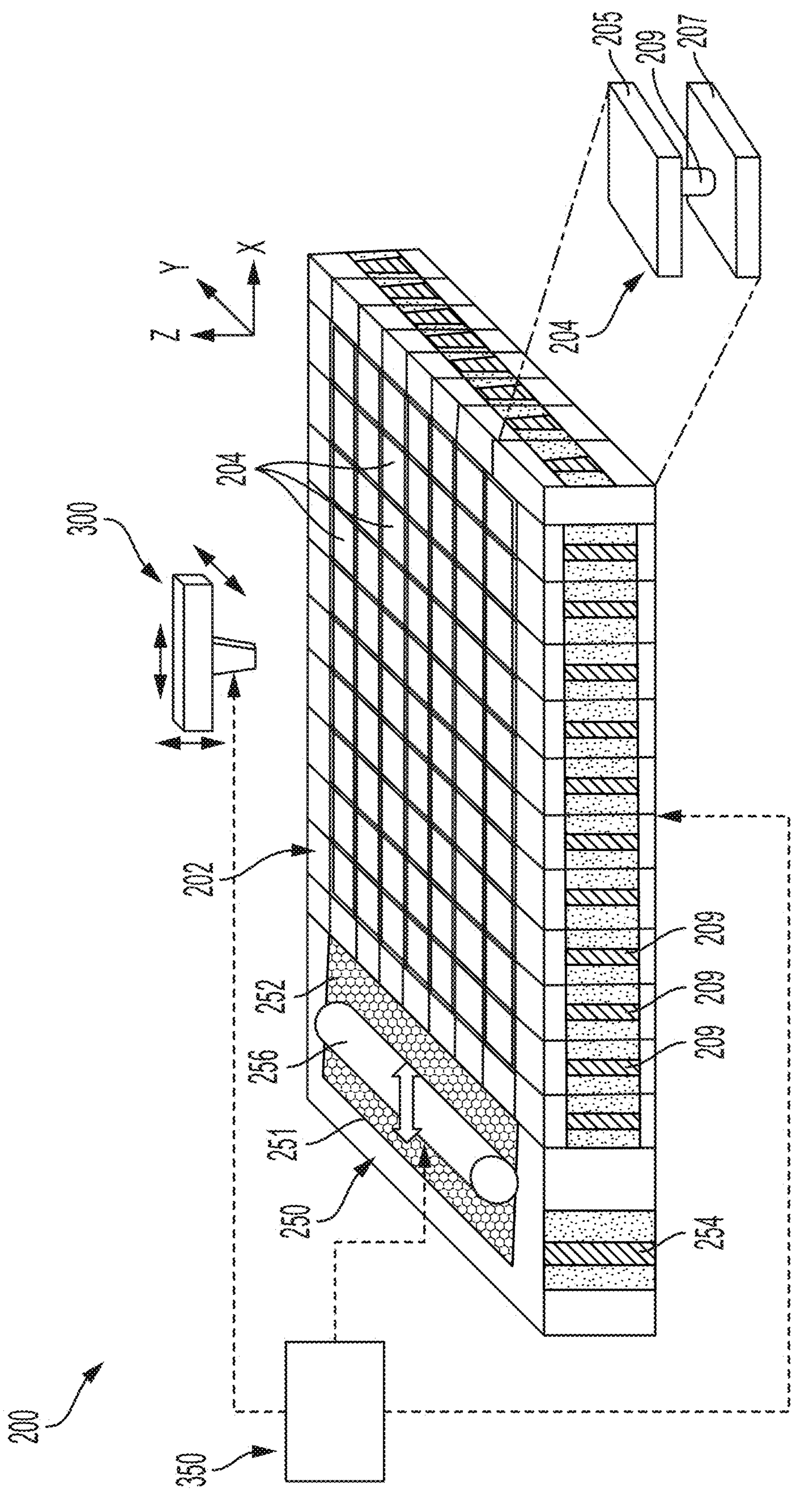
FIG. 2 depicts a block diagram of a powder fusion 3D additive manufacturing system in accordance with one or more embodiments of the present disclosure.

Referring now to FIG. 2, a powder fusion three-dimensional (3D) additive manufacturing (AM) system 200 is illustrated according to a non-limiting embodiment of the present disclosure. Although the powder fusion 3D AM system 200 is capable of performing 3D PDF printing, it should be appreciated that the powder fusion 3D AM system 200 should not be limited to a particular type of AM technology or technique.

The powder fusion 3D AM system 200 includes a modular powder bed 202, a powder delivery unit 250, a laser assembly 300, and a controller 350. The controller 350 is in signal communication with the modular powder bed 202, the powder delivery unit 250, and the laser assembly 300. As described herein, the powder fusion 3D AM system 200 can dynamically adjust the position and alignment of the modular powder bed 202 in real time to reduce powder consumption while providing tailored 3D additive manufacturing (e.g., PBF printing) of a work product or workpiece. Additionally, the powder fusion 3D AM system 200 is capable of controlling the laser assembly 300 to manage laser beam redirection strategies while ensuring proper angular attack for quality powder fusion correction, thereby enhancing the overall efficiency and effectiveness of the powder fusion process.

The modular powder bed 202 extends along a first axis (e.g., X axis) to define a length, a second axis (e.g., Y axis) orthogonal to the first axis to define a width, and a third axis (e.g., Z axis) orthogonal to the first and second axes to define a vertical height. The modular powder bed 202 includes an array of individual robotic stages 204. The robotic stages 204 (e.g., first-type robots) are capable of supporting a load. An example of a load described herein refers to powder 252 provided by the powder delivery unit 250. It should be appreciated, however, that other types of loads or AM materials used perform AM processes such as, for example, 3D printing or laser sintering. According to a non-limiting embodiment, the bases have a square or rectangular surface, but the profile and shape of the bases can vary without departing from the scope of the invention.

Each individual robotic stage 204 includes an upper surface 205, a base 207, and an adjustable actuator 209 that couples the upper surface 205 to the base 207. Various types of actuators 209 can be employed including, but not limited to an electrical actuator, a hydraulic actuator, and a combination thereof, i.e., an electro-hydraulic actuator. When implementing the actuators 209 as hydraulic actuators, for example, each actuator 209 can be implemented as hollow cylinders. The cylinders can contain hydraulic fluid and a piston capable of vertical movement, with linear actuators connected to the pistons to facilitate the vertical adjustment. A hydraulic pump and reservoir (not shown) can provide the necessary pressure, with control valves (not shown) regulating fluid flow to achieve precise height adjustments.

The actuator 209 of each individual robotic stage 204 is in electrical communication with the controller 350. Accordingly, the controller 350 can independently control the actuator 209 to adjust its vertical height. In this manner, the upper surface 205 can be raised or lowered with respect to the base 207. According to a non-limiting embodiment, actuator 209 of each robotic stage 204 can be individually controlled. In this manner, the upper surfaces 205 of each robotic stage 204 can be independently raised or lowered with respect to one another.

The powder delivery unit 250 includes a powder bin 251, bin actuator 254, and a roller 256. The powder bin 251 serves as a reservoir to contain the powder 252. The bin actuator 254 adjusts a height of the powder bin 251 to regulate the flow of powder provided by the hopper to the roller 256. The roller 256 is positioned in line with the top opening of the powder bed 202 and moves the powder 252 across the entire cross-sectional area, distributing the powder evenly across the upper surfaces 205 defining the modular powder bed 202. According to a non-limiting embodiment, the bin actuator 254 can be controlled by the controller 350 to adjust the vertical height of the powder bin 251 and roller 256. In this manner, the adjustment of the powder bin 251 regulates the delivery of powder 252 from the powder bin 251 to the roller 256. The roller 256 can then gather powder 252 from the powder bin 251 and move across the entire cross-sectional area of the modular powder bed 202 defined by the upper surfaces 205 to ensure an even distribution.

The laser assembly 300 is moveable in three-dimensions to direct laser energy 302 toward the modular powder bed 202. The controller 350 can control the laser assembly 300 to adjust a position of the laser head, thereby controlling the direction and location of the laser energy 302. In one or more embodiments, the controller 350 receives an input model of a workpiece to be fabricated, and adjusts the position of the laser assembly to impinge the laser energy onto portions of the powder 252. The laser energy 302 sinters the powder 252, thereby forming portions of the workpiece.

Figure 3A:
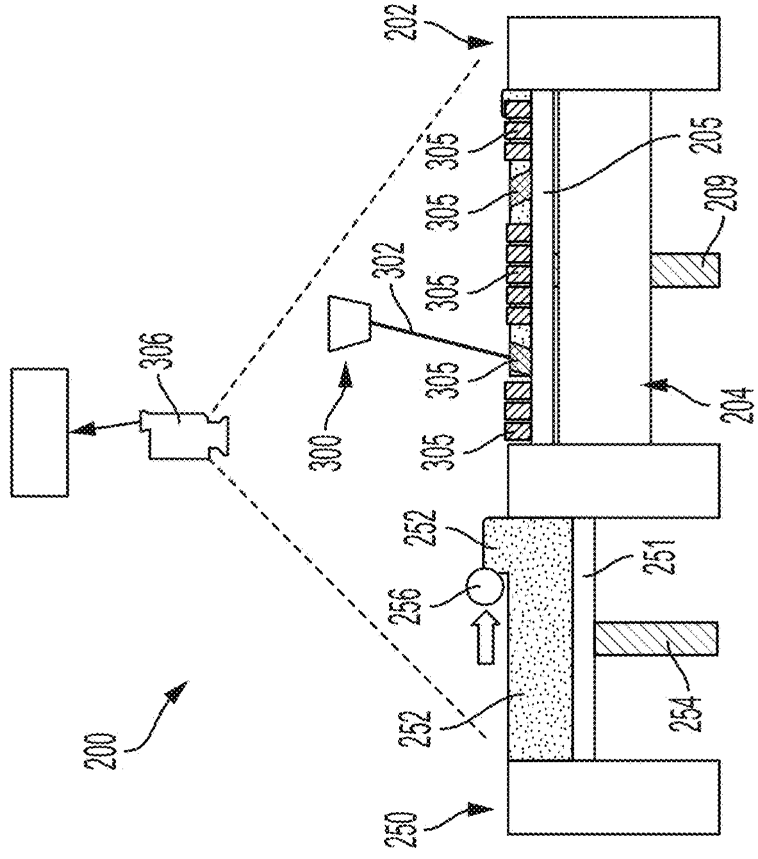
FIGS. 3A, 3B, and 3C depict operation of a powder fusion 3D additive manufacturing additive manufacturing system according to a non-limiting embodiment of the present disclosure.
Figure 3B:
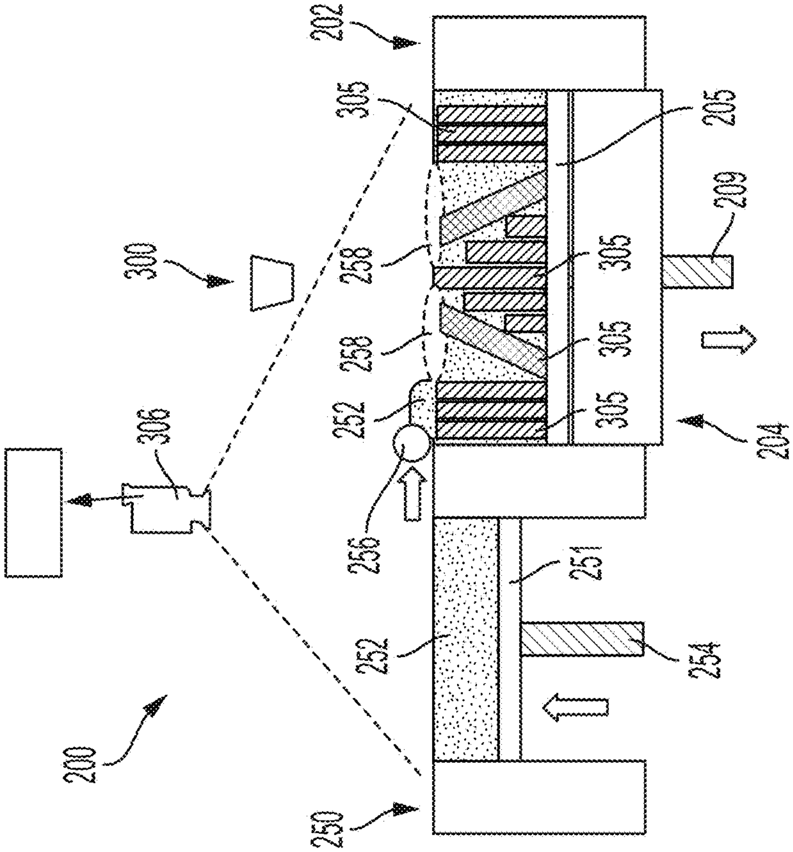
Figure 3C:
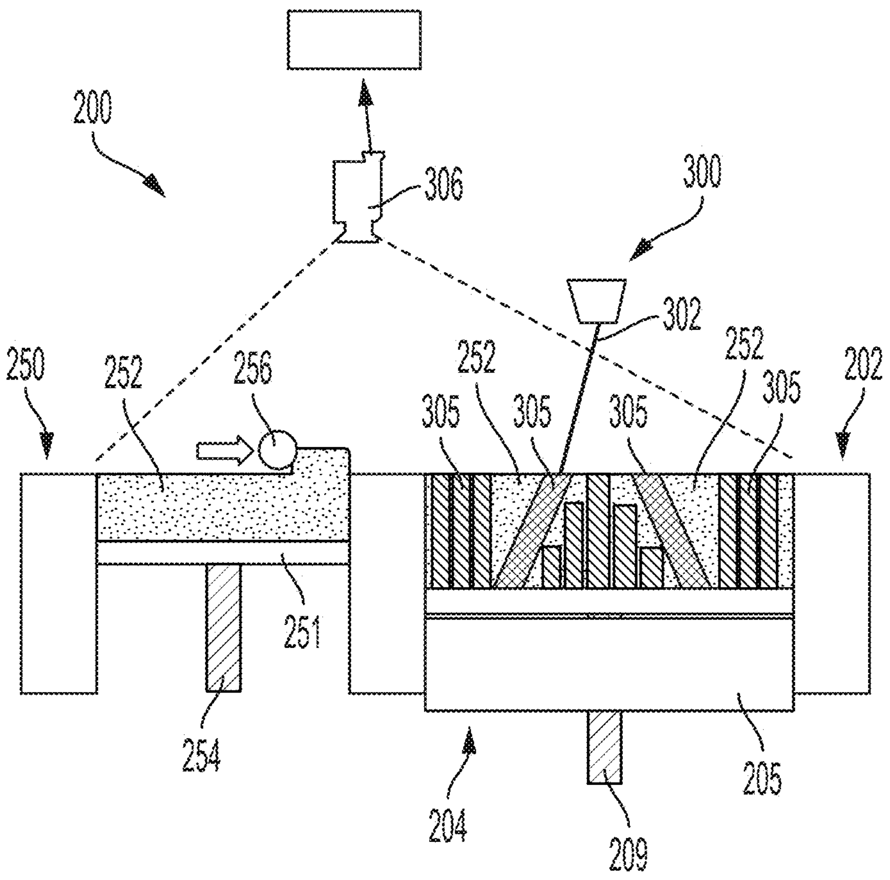

Turning to FIGS. 3A through 3C, operation of the powder fusion 3D AM system 200 is illustrated according to a non-limiting embodiment of the present disclosure. In this embodiment, the height of one or more of the robotic stages 204 can be dynamically adjusted based on the required thickness of the powder layer distributed on the powder bed 202. In addition, the height of the powder bin 251 can be dynamically adjusted to maintain a consistent distance from the powder bed surface, ensuring even distribution of the powder 252. In one or more embodiments, powder fusion 3D AM system 200 can employ one or more sensors 306 and feedback mechanisms to adjust the heights of the powder bin 251 and the upper surface 205 of one or more of the robotic stages 204.

As shown in FIG. 3A, for example, when initiating the powder fusion process, the robotic stages 204 start at their highest level and gradually reduce their height as needed, optimizing the distribution and usage of the powder 252. The powder fusion 3D AM system 200 is illustrated directing laser energy 302 toward the modular powder bed 202 to sinter powder 252 distributed thereon while the powder bin 251 and one or more upper surfaces 205 of the robotic stages 204 are adjusted to a first height. Accordingly, the laser energy 302 sinters targeted portions of the powder 252 to form portions of a workpiece 305.

Turning to FIG. 3B, the controller 350 switches off output of the laser energy 302 and communicates with the powder bin 251 and/or one or more of the robotic stages 204 to control the bin actuator 254 and/or stage actuators 209, thereby adjusting the height of the powder bin 251 and/or the upper surface 205. In a non-limiting embodiment, the bin actuator 254 is controlled to adjust the height of the roller 256 and maintain a consistent distance from the surface of modular powder bed 202, ensuring even distribution. In an embodiment, sensors 306 provide feedback information to align the roller's position with the modular powder bed 202 to optimize the powder distribution process.

The controller 350 also receives and processes input parameters such as the 3D profile (e.g., shape and dimensions) of the workpiece 305 being fabricated to dynamically control the actuators 209 to ensure the profile of the modular powder bed 202 matches the workpiece's specifications. The controller 350 then controls the roller 256 to gather powder 252 from the powder bin and distribute it across the modular powder bed 202. This adaptive feature allows for the optimal use of powder 252 by occupying empty spaces 258 in the 3D structure of the workpiece 305 being manufactured.

In a non-limiting embodiment, the controller 350 analyzes the 3D workpiece 305 to identify the open spaces 258 or voids within the workpiece 305. This analysis ensures the effective distribution of powder 252 and further optimizes the fusion process. The open spaces 258 can be identified using a digital 3D model of the workpiece 305, which is converted into a mesh format to simplify the identification and analysis process. Accordingly, the controller 350 identifies spaces 258 within the model that are hollow or contain gaps, and calculates the volume and cross-sectional area of these open spaces 258. This information is used by the controller 350 to determine how the actuators 209 of one or more robotic stages 204 should be adjusted to fill these spaces 258 effectively. In an embodiment, the controller 350 performs a comparative evaluation of the 3D workpiece 305 and the current profile modular powder bed 202, simulating the required adjustments to the upper surfaces 205 of the robotic stages 204. This simulation ensures that the powder 252 can be distributed efficiently and that the workpiece 305 is manufactured with high precision and quality. Accordingly, the real-time monitoring and adjustments maintain the efficiency and accuracy of the powder fusion process. Once the target heights of the powder bin 251 and/or the upper surfaces 205 of the robotic stages 204 have been reached, the controller 350 switches on output of the laser energy 302 and the newly distributed layer of powder 252 is sintered to continue manufacturing the workpiece 305 as shown in FIG. 3C.

According to a non-limiting embodiment, the controller 350 processes 3D model data to determine target height adjustments for each actuator 209, ensuring efficient powder usage and even powder distribution. One or more sensors 306 monitor the height and position of the actuators 254 and/or 209 in real-time, providing feedback for continuous optimization. The sensors 306 can include, but are not limited to, a camera that monitors the heights of the powder bin 251 and the upper surfaces 205 of the robotic stages 204, along with the thickness of the layer of distributed powder 252 on the modular powder bed 202 (e.g., the upper surfaces 205). The controller 350 can then identify which upper surfaces 205 need to be adjusted (via the actuators 209) and by how much, ensuring an even distribution of powder 252 and optimizing its usage. This approach ensures that powder 252 is used effectively, reducing waste and enhancing the quality of the manufactured workpiece 305.

Figure 4:
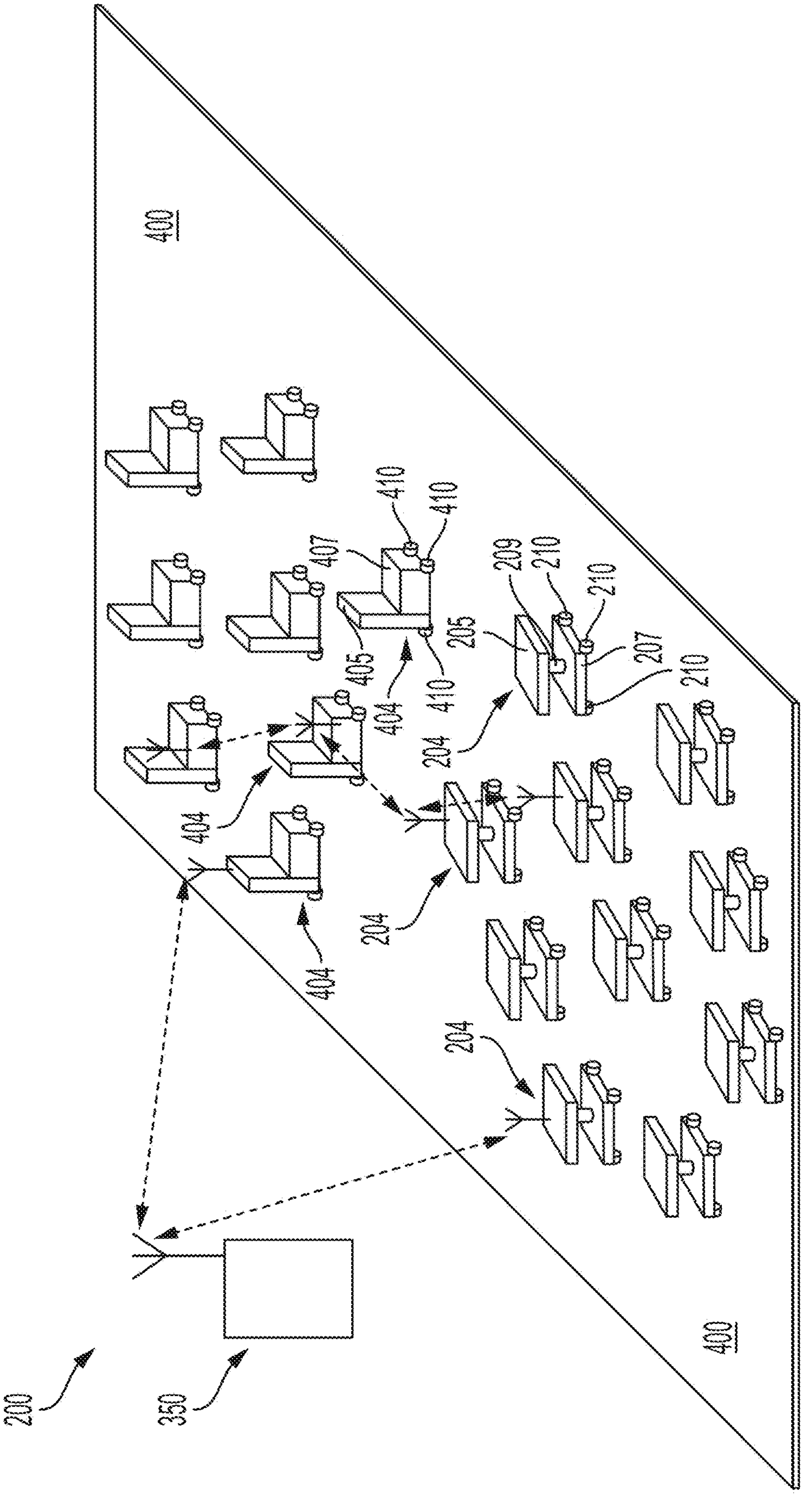
FIG. 4 depicts autonomous robotic stages and autonomous robotic barriers capable of forming a custom modular powder bed according to a non-limiting embodiment of the present disclosure.

Turning now to FIG. 4, the powder fusion 3D AM system 200 is illustrated according to another non-limiting embodiment. The powder fusion 3D AM system 200 employs a plurality of robotic stages 204 (e.g., first-type robots) and a plurality of robotic barriers 404 (e.g., second-type robots). The robotic stages 204 and a plurality of robotic barriers 404 can be dynamically moved and assembled together to from a modular powder bed 202 having various custom powder bed profiles that provide optimum powder usage when performing a PBF process for manufacturing a target 3D workpiece.

As described above, the vertical position (e.g., height) of an upper surface 205 of each of the robotic stages 204. Accordingly, the actuators 209 are configured to adjust the upper surface 205 to a target height while bearing significant loads, e.g., an amount of powder 252. Each robotic stage 204 is also configured to move about an industrial environment 400. In some embodiments, the robotic stages 204 can be manually moved into a target position. In some embodiments, the robotic stages 204 are self-moving or "autonomous. For example, each of the robotic stages 204 can communicate wirelessly with the controller 350 and/or one another. Each of the robotic stages 204 can also employ various sensors for navigation and obstacle detection, ensuring accurate autonomous positioning and alignment with respect to one or more of the robotic barriers 404. In this manner, the robotic stages 204 can move autonomously throughout the environment 400 and to facilitate "swarm robotics" capabilities. In this manner, the robotic stages 204 can collaborate with one another and move themselves into an arrangement that forms a foundation of a modular powder bed 202 having a custom profile that mimics the profile of a workpiece to be manufactured. In an embodiment, each of the robotic stages 204 includes one or more wheels 210 allowing the robotic stages 204 to move about the environment 400. In other embodiments, the robotic stages 204 are mounted on tracks (not shown) and are controlled to move about the environment 400 via wireless data exchange with the controller 350.

Each of the robotic barriers 404 includes a wall 405 coupled to a footing 407. The robotic barriers 404 are also configured to move about the environment 400. For example, one or more wheels 410 can be coupled to the footing 407 to facilitate movement about the environment 400. In some embodiments, the robotic barriers 404 can be manually moved into a target position. In some embodiments, the barriers 404 are self-moving or "autonomous like the robotic stages 204 described above. The robotic barriers 404 operate alongside the robotic stages 204 to align the walls 405 with the upper surfaces 205 to construct a barrier or perimeter of a modular powder bed 202 having a dynamically defined or custom designed modular powder bed 202, further enhancing the flexibility and efficiency of the powder fusion 3D AM system 200.

According to a non-limiting embodiment, the robotic barriers 404 can vary in dimensions to match the requirements of different powder bed configurations. For example, the robotic barriers 404 can wirelessly communicate with the robotic stages 204 to dynamically define a powder bed shape or profile to establish a closed-loop wall or frame around the foundation established by the robotic stages 204. This configuration allows for providing a customized modular powder bed 202 for a given manufacturing workpiece job, optimizing powder usage and enhancing the structural integrity of the 3D manufactured workpiece.

As described herein, the powder fusion 3D AM system 200 facilitates collaborative interaction between the robotic stages 204 and the robotic barriers 404 to construct a dynamically adjustable modular powder bed 202. According to an embodiment, the controller 350 can receive a 3D model 352 of a workpiece 305 to be manufactured, and then command the robotic stages 204 and robotic barriers 404 to collaborate and establish a modular powder bed 202 having a customized profile that is tailored to the dimensions and shape indicated by the 3D model 352.

Figure 5A:
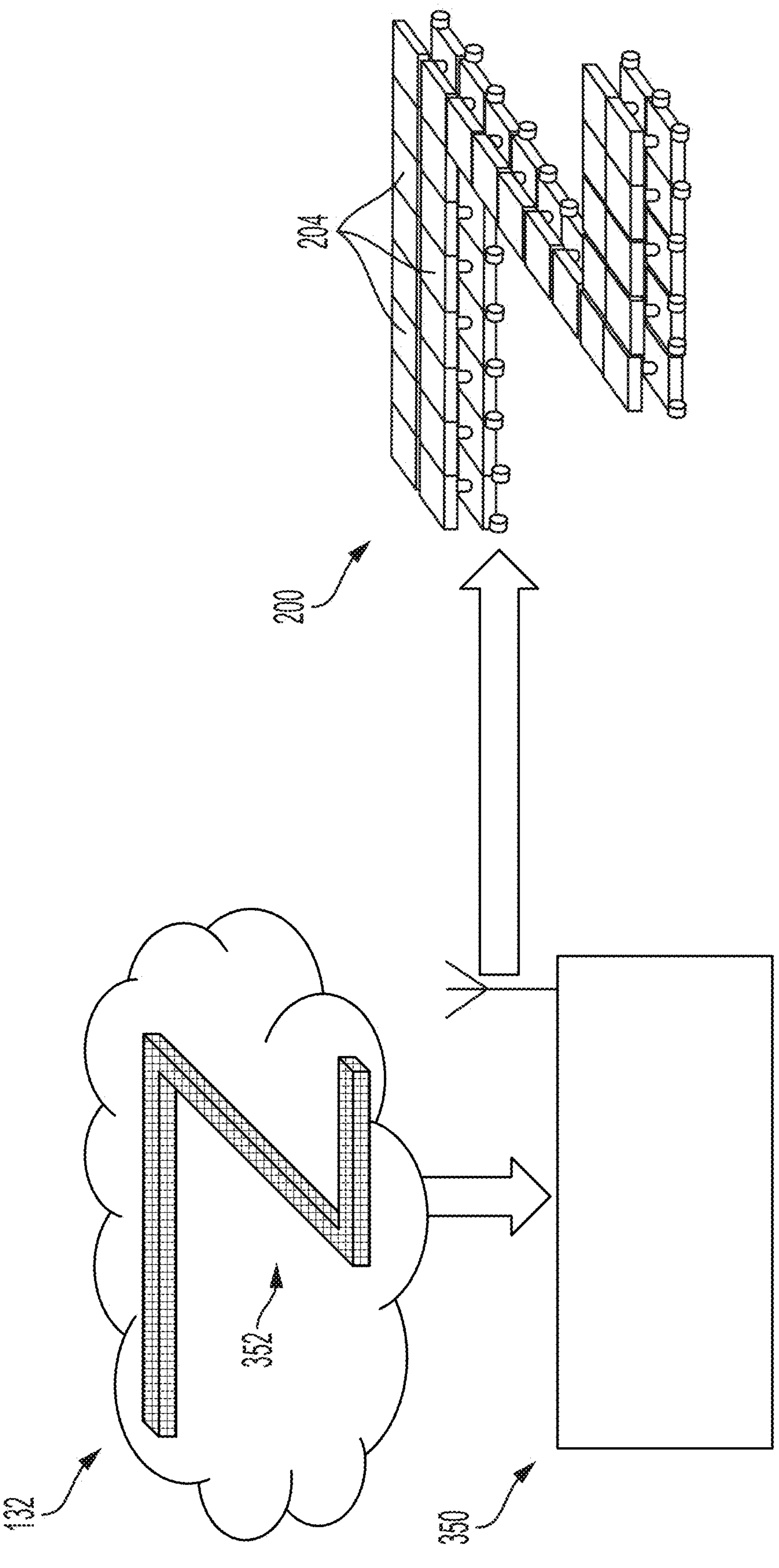
FIG. 5A depicts the robotic stages after self-arranging into a foundation of a modular powder bed having a custom profile according to a non-limiting embodiment of the present disclosure.

Turning to FIG. 5A, for example, the controller 350 receives the 3D model 352 (e.g., from remote database 132 or a cloud server) of a workpiece to be manufactured, analyzes the 3D model 352, commands the robotic stages 204 to form the base structure of a dynamically formed modular powder bed 202. Accordingly, a plurality of the robotic stages 204 autonomously position themselves to form a base having a profile defined by the 3D model 352 and to adjust the height of their upper surface 205 to create the foundation of the modular powder bed 202.

According to a non-limiting embodiment, the analysis of the 3D model 352 includes performed by controller 350 includes identifying its profile, e.g., its dimensions and shape. This analysis involves segmenting the model 352 into multiple sections and converting these sections into a cuboid structure. The cuboids are then aggregated to form the complete 3D workpiece and determine how it can be efficiently arranged within the modular powder bed 202.

The controller 350 can also identify tolerance levels of the modular powder bed 202 to ensure the 3D workpiece fits within the customized profile and dimensions of the modular powder bed 202. This involves determining the optimal shape and configuration of the modular powder bed 202, comparing it with the specifications of the robotic stages 204 and robotic barriers 404, and the number of available the robotic stages 204 and robotic barriers 404. The analysis helps in identifying the number and arrangement of the robotic stages 204 and robotic barriers 404 required to create a suitable powder bed 202 for the workpiece to be manufactured to ensure efficient use of the powder 252 and maintain the structural integrity of the manufactured workpiece.

Figure 5B:
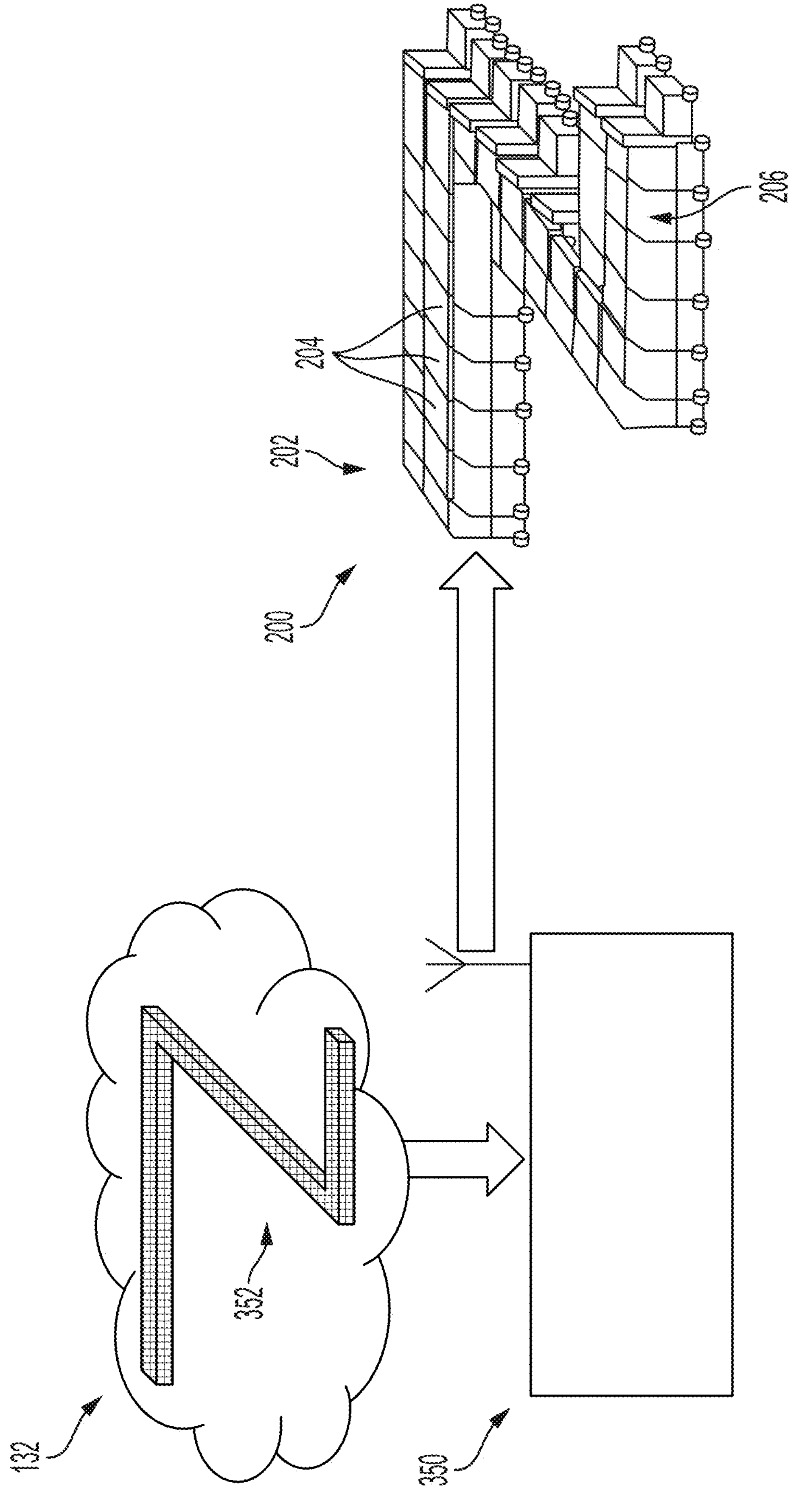
FIG. 5B depicts the robotic barriers after self-arranging to form the barrier walls of the modular powder bed according to a non-limiting embodiment of the present disclosure.

In FIG. 5B, the controller 350, at the same time or subsequent to assembling the robotic stages 204, commands the robotic barriers 404 to position themselves with respect to the robotic stages 204 and couple together their walls 405 to form a perimeter wall or frame of the modular powder bed 202. In this manner, the robotic stages 204 and the robotic barriers 404 can dynamically establish a modular powder bed 202 having a customized profile that is tailored to the dimensions and shape of a 3D workpiece 305 to be manufactured.

Figure 5C:
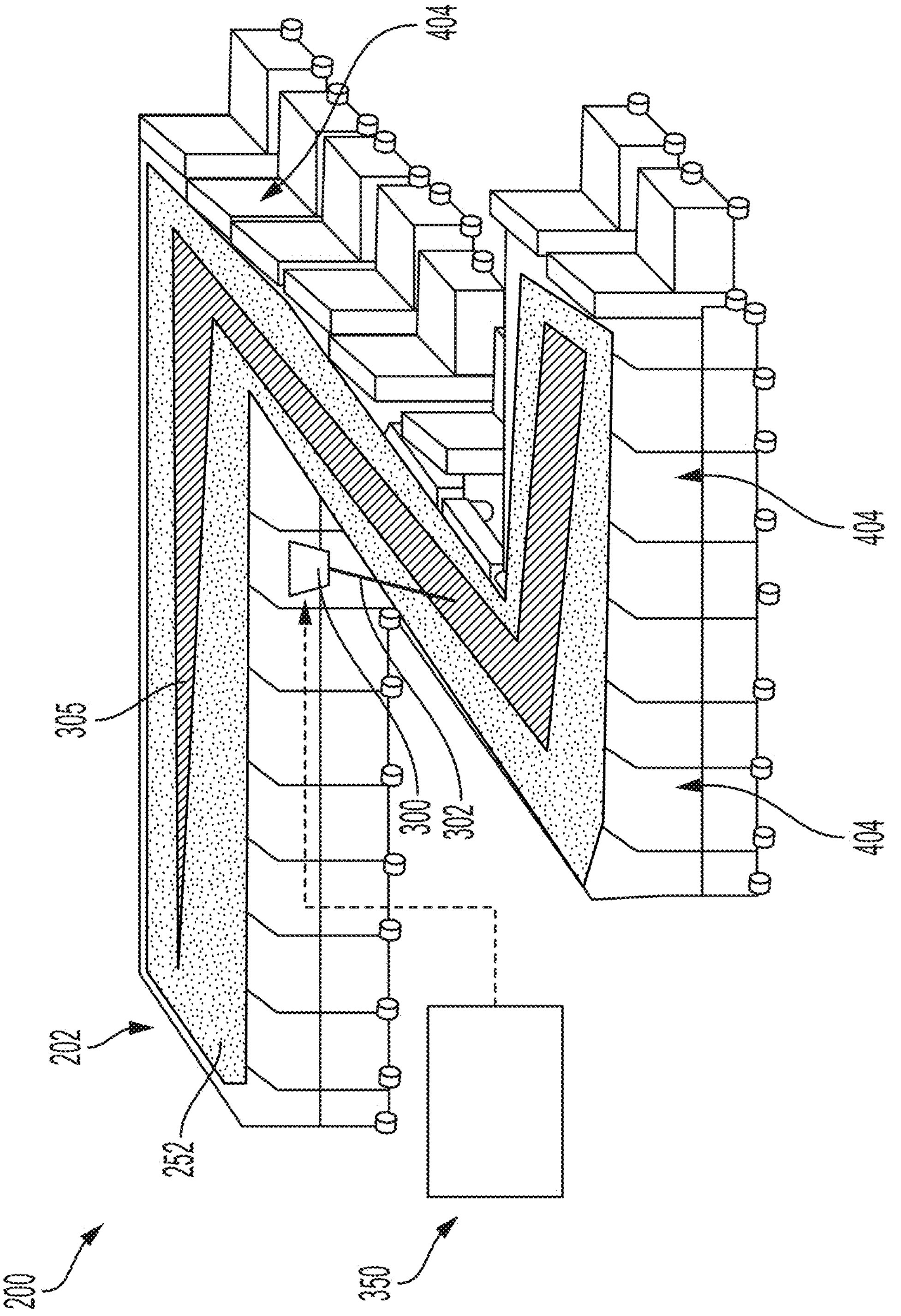
FIG. 5C depicts sintering powder distributed on the modular powder bed formed by the robotic stages and robotic barriers to manufacture a workpiece.

Turning to FIG. 5C, the powder 252 is distributed across the dynamically assembled modular powder bed 202. Since the surface area is optimized according to the current workpiece being manufactured, the optimal amount of powder is used to load the modular powder bed 202. Once the powder is distributed, the laser assembly 300 can be moved with respect to the custom profile of the dynamically assembled modular powder bed 202 to performed a powder fusion process, e.g., sinter the powder 252 and fabricate the workpiece 305. According to a non-limiting embodiment, as the powder fusion process progresses, one or more of the robotic stages 204 can adjust (e.g., reduce) their height incrementally, maintaining the appropriate level for sintering the powder 252.

Figure 6:
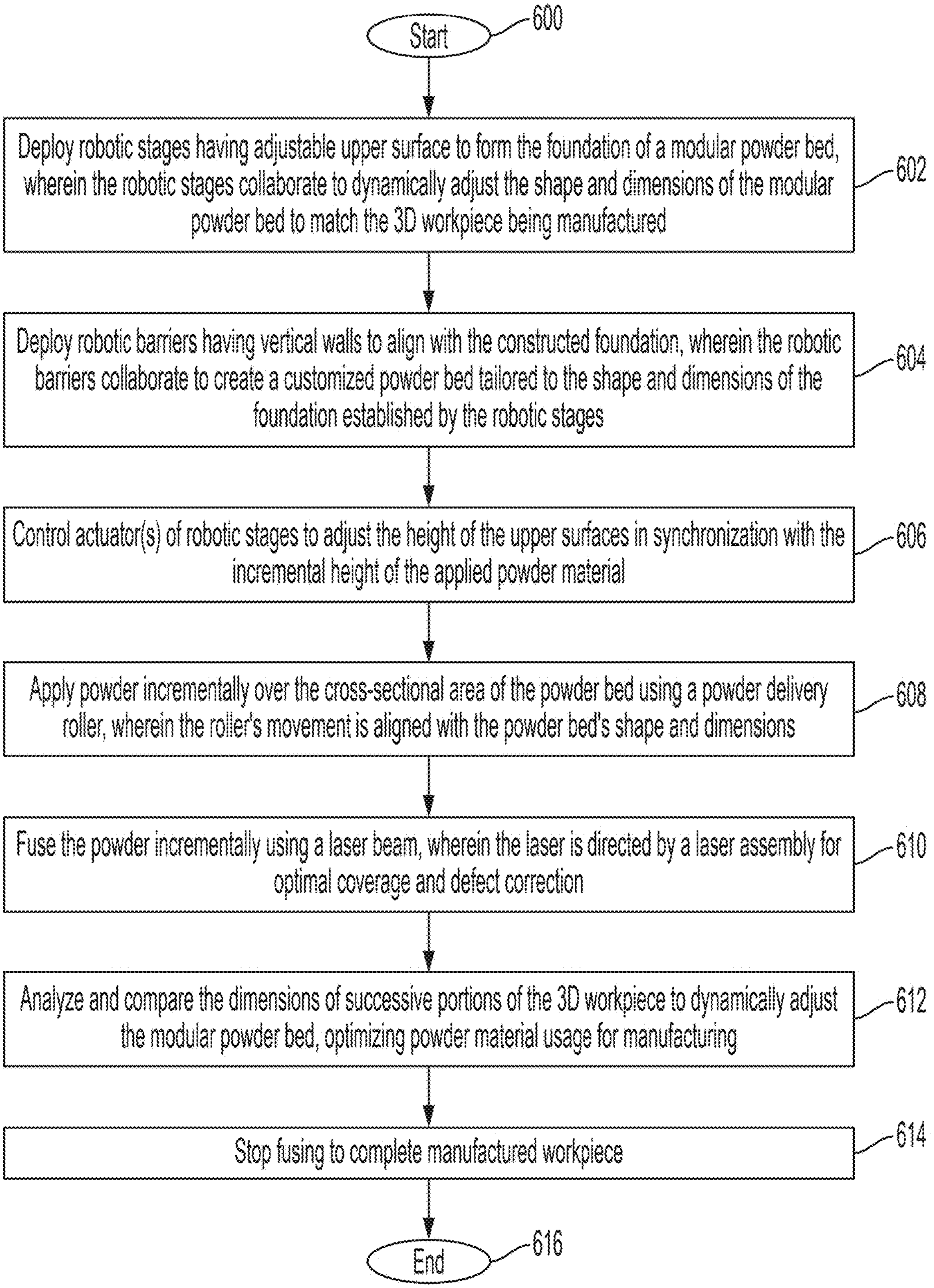
FIG. 6 is a flow diagram illustrating a method of constructing a dynamic modular powder bed for manufacturing 3D workpieces according to a non-limiting embodiment of the present disclosure.

Referring now to FIG. 6, a method of constructing a dynamic modular powder bed 202 for manufacturing a 3D AM workpiece is illustrated according to a non-limiting embodiment of the present disclosure. The method begins at operation 600, and at operation 602 a number of robotic stages 204 including adjustable upper surface 205 autonomously move to form a foundation of a modular powder bed 202. According to an embodiment, the robotic stages 204 collaborate to dynamically adjust the profile (e.g., shape and dimension) of the modular powder bed 202 to match the profile 3D workpiece 305 being manufactured. At operation 604, a number of robotic barriers 404 having vertical walls autonomously move to align with the robotic stages 204. According to a non-limiting embodiment, the robotic barriers 404 collaborate with one another and also the robotic stages 204 to form a barrier or frame around the perimeter of the modular powder bed 202 that conforms with the profile of the foundation established by the robotic stages 204. At operation 606, actuators of the robotic stages 204 are controlled to adjust the height of one or more upper surface 205 in synchronization with the incremental height of the applied powder 252. At operation 608, powder 252 is incrementally distributed over the cross-sectional area of the modular powder bed 202. According to a non-limiting embodiment, and the powder 252 is distributed using a powder delivery roller 256 and the roller's movement is aligned with the bed's shape, dimensions, height of the upper surfaces 205. At operation 610, the powder 252 is incrementally fused using a laser beam 302 to incrementally form the workpiece 305. According to a non-limiting embodiment, the laser beam 302 is directed by dynamically controllable laser assembly 300 to achieve optimal coverage and defect correction. At operation 612, the dimensions of successive portions of the workpiece 305 are analyzed to dynamically adjust (e.g., adjust the height) the modular powder bed 202. At operation 614, fusing of the powder 252 is stopped to complete manufacturing of the 3D workpiece 305, and the method ends at operation 616.

According to a non-limiting embodiment of the present disclosure, the powder fusion 3D AM system 200 can address the challenge of repairing large and complex 3D objects, such as turbine blades, by analyzing the object to identify areas in need of repair using powder fusion techniques. For example, the controller 350 can analyze a detailed 3D scan using one or more image sensors 306 of the entire object using advanced scanning technologies like photogrammetry or laser scanning. The scanned data is then compared with the original 3D model to detect defects or areas requiring repair. These defects might include cracks, structural weaknesses, or other irregularities.

The controller 350 can then classify any detected defects based on severity and type, determining the appropriate repair method for each. The controller 350 can also evaluate the accessibility of each defect for powder fusion repair to consider whether a direct or deflected laser beam 302 can effectively reach and repair the area(s) containing the defect. By simulating the line of sight from the defect to the laser beam 302, the controller 350 can identify the optimal positioning and orientation for the repair process. This simulation assists in determining how the large object should be aligned to ensure the laser beam 302 can perform the repair efficiently.

According to a non-limiting embodiment of the present disclosure, the controller 350 is also capable of identifying portions of defective areas included in large complex structures or object where depositing powder 252 might be challenging. In an embodiment, the controller 350 utilizes 3D scanning provided by one or more image sensors 306, to generate a detailed digital model of the entire structure or object, including the defective areas. The controller 350 then performs image processing and executes computer vision algorithms to detect and segment these areas, providing a clear identification of the regions requiring repair.

The controller 350 then execution a simulation algorithm to generate a virtual powder bed, layer by layer. The simulation algorithm considers various environmental parameters and conditional including, but not limited to, gravity, powder density, particle size, powder deposition capabilities, environmental temperature, environmental humidity, and surface area. This simulation helps identify any portions of the defective area(s) that are difficult to reach or cover with the powder 252. In a non-limiting embodiment, the controller 350 assesses the accessibility of each defective portion based on various laser parameters including, but not limited to, angles of approach, clearance for powder deposition, and heat distribution during the powder fusion process. This comprehensive analysis ensures that the repair process is planned effectively, even for challenging areas.

In addition to powder bed formation, the controller 350 can also analyzes the geometry of a physical object to identify areas that are difficult for laser-based activities, such as cutting, welding, engraving, or 3D printing. By utilizing 3D scanning technology, the powder fusion 3D AM system 200 creates a digital representation of the object's shape, contours, and surface irregularities.

According to a non-limiting embodiment, the controller 350 can track the direction and path of the laser beam 302 in relation to the object, and overlay 3D scan data with the requirements of the laser-based activities. This analysis identifies geometric constraints, such as tight corners, complex curves, or deep crevices, which might hinder the laser's access to the object. The controller 350 can then evaluate the laser beam's path and orientation to determine if there are any obstructions or reflections that may affect the activity. This thorough analysis ensures that the laser beam 302 can be applied effectively, even in difficult-to-reach areas.

Figure 7:
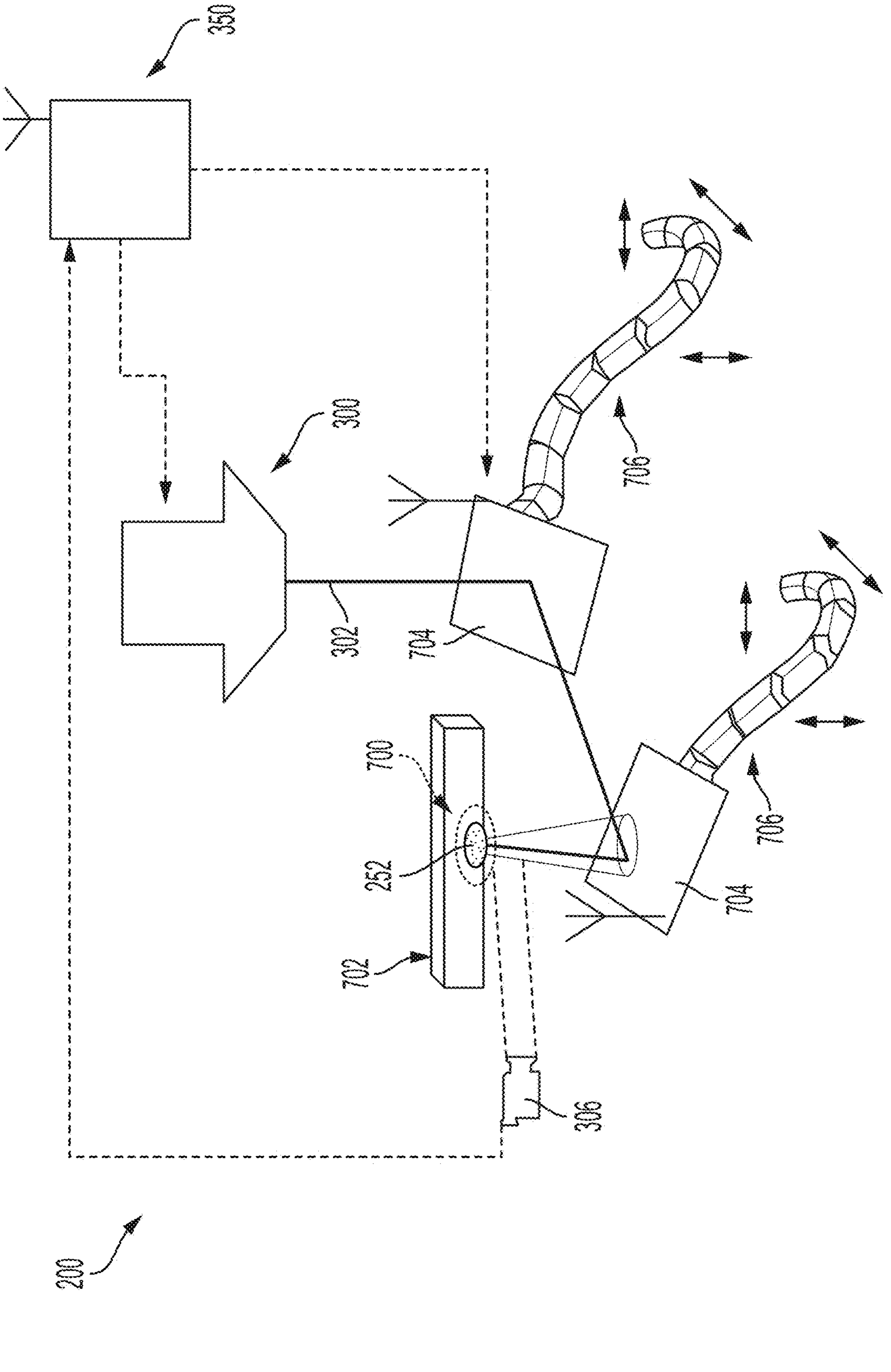
FIG. 7 depicts the powder fusion 3D AM system dynamically adjusting laser beam reflection to repair a defect located outside the line-of-site of the laser assembly according to a non-limiting embodiment of the present disclosure.

Turning now to FIG. 7, the powder fusion 3D AM system 200 is illustrated performing a method to evaluate whether the laser assembly 300 can achieve the correct orientation to focus the laser beam 302 on a target defective area 700 of an object or part 702 to repair a defect according to a non-limiting embodiment of the present disclosure. The powder fusion 3D AM system 200 can dynamically adjust reflection of the laser beam to repair a defect located outside the line-of-site of the laser assembly. In an embodiment, the controller 350 can simulate various possible laser beam paths and identify how the laser beam 302 should be redirected if the laser assembly 300 cannot focus the laser beam 302 directly on the defective area 700. When performing the analysis, the controller 350 considers various information including, but not limited to, properties and placement of reflectors required for redirecting the laser beam 302.

By simulating one or more paths of the laser beam 302, the controller 350 can determine the optimal placement of reflectors 704 to redirect the laser beam 302 to a target location containing the defect. According to a non-limiting embodiment, various combinations of reflections are considered to minimize the number of redirections needed. This evaluation ensures that the laser beam 302 can reach the target defect location 700 containing the defect with sufficient powder 252 and precision for effective repair.

According to a non-limiting embodiment, the controller 350 can evaluate the reduction in laser beam power due to reflection and adjusts the power source driving the laser beam 302 accordingly. The controller 350 also can analyze the reflective properties of the material forming 3D object's surface. The reflective properties can include reflectivity, absorption, and scattering characteristics. In an embodiment, the controller 350 measures the initial power of the laser beam 302 before it encounters any reflective surfaces, and the power reduction after reflection is calculated. The controller 350 then compares the reduction to the required power level for the repair activity. In a non-limiting embodiment, the powder fusion 3D AM system 200 includes a dynamic power adjustment mechanism (not shown) at the source of the laser beam 302. The dynamic power adjustment mechanism can adjust (e.g., increase) the source beam power if the reflected beam power falls below a power threshold. In an embodiment, a sensor 306 continuously monitors the reflected power of the laser beam 302 and establishes a feedback loop with the controller 350 to ensure the source power is fine-tuned to maintain a target power level of the laser beam 302 necessary to effectively sinter the powder 252 and repair the defect.

According to an embodiment of the invention, the powder fusion 3D AM system 200 can ensure that the reflected laser beam 302 maintains the correct angle of attack upon the powder 252 within allowed limits. In an embodiment, the controller 350 calibrates the reflector 704 and associated components, to ensure proper alignment with respect to the powder 252 disposed in the target defect region 700.

According to a non-limiting embodiment, the controller 350 tracks the position and orientation of one or more of reflectors 704 in real-time, and dynamically adjusts the angle of attack of one or more of the reflectors 704 as needed. Accordingly to a non-limiting embodiment, the reflectors 704 can be established as reflector modules that implement one or more actuators and/or one or more motors that can dynamically adjust the reflector's position and orientation based on commands from the controller 350 generated according to the feedback control loop. In a non-limiting embodiment, the reflector module 704 is established as a snake-arm robot or a snake robot, also known as a "SnakeBot." The snake-arm robot 706 or SnakeBot 706 can wirelessly communicate with the controller 350 to receive commands that adjust the position of the snake-arm robot 706 or SnakeBot 706 and outputs data indicating its current position or adjustment to establish the feedback control loop.

In a non-limiting embodiment, computational models simulate how changes in the reflector's position impact the laser beam's angle of attack, assisting in making rapid adjustments. This ensures that the laser beam 302 is directed toward the target defect area at an angle necessary to effectively fuse or sinter the powder 252. In this manner, the quality and efficiency of the PBF manufacturing process can be achieved.

According to a non-limiting embodiment of the present disclosure, the powder fusion 3D AM system 200 can implement a robotic mount (not shown) in signal communication with the controller 350 to facilitate the repair of large 3D objects 702. The robotic mount can change the alignment of the object 702 to ensure the path of the laser beam 302 aligns with the target defect area 700 included in the object 702. According to a non-limiting embodiment, the robotic mount includes one or more robotic arms (not shown) equipped with gripping mechanisms to securely hold the object 702. In a non-limiting embodiment, the robotic powder fusion 3D AM system 200 employs tracking technologies and image sensors 306 such as cameras and laser scanners, for example, to accurately sense the object's current position and orientation. Based on simulations of the line of sight between the target defect area 700 and the laser beam 302, the controller 350 determines how the robotic arm should be adjusted to achieve the optimal alignment. This ensures that the laser beam 302 can effectively perform powder fusion repairs on the identified defects. Once gripped, the controller 350 can control the robotic arm to adjust the object's orientation and angular position with respect to the laser beam 302 as required.

By integrating the advanced capabilities described herein, the powder fusion 3D AM system 200 significantly enhances the efficiency, precision, and flexibility of powder bed fusion 3D printing, particularly for complex and large-scale manufacturing and repair tasks.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A powder fusion three-dimensional (3D) additive manufacturing (AM) system comprising: a plurality of robotic stages having an adjustable upper surface, each of the plurality of robotic stages configured to move about a surface of an environment along a first horizontal axis and a second horizontal axis different from the first horizontal axis, each of the plurality of robotic stages configured to self-align themselves to form a foundation of a modular powder bed; and a plurality of robotic barriers having vertical walls, each of the plurality of robotic barriers configured to self-align with the foundation established by the plurality of robotic stages, wherein an upper surface of at least one of the plurality of robotic stages is adjustable to set an initial height of the modular powder bed configured to receive an AM powder.

2. The powder fusion 3D AM system of claim 1, wherein the plurality of robotic stages are configured to collaborate with one another to self-align with one another and dynamically define a profile of the modular powder bed that mimics a profile of a workpiece to be manufactured.

3. The powder fusion 3D AM system of claim 2, wherein the plurality of robotic barriers are configured to collaborate with one another to self-align with one another and form a barrier wall of the modular powder bed.

4. The powder fusion 3D AM system of claim 3, wherein the barrier wall surrounds an entire perimeter of the foundation.

5. The powder fusion 3D AM system of claim 2, wherein each of the plurality of robotic stages include an actuator that is configured to adjust a height of the upper surface.

6. The powder fusion 3D AM system of claim 5, further comprising, for each of the robotic stages, the actuator being configured to set the initial height based on the profile of the workpiece to be manufactured.

7. The powder fusion 3D AM system of claim 2, further comprising a controller configured to be in signal communication with the plurality of robotic stages and the plurality of robotic barriers, the controller configured to determine the profile of workpiece to be manufactured, and to exchange data indicating the profile with the plurality of robotic stages and the plurality of robotic barriers.

8. The powder fusion 3D AM system of claim 7, wherein the plurality of robotic stages and the plurality of robotic barriers are configured to self-align themselves based at least in part on the data exchanged with the controller.

* * * * *